(12) United States Patent
Kooij

(10) Patent No.: US 6,196,216 B1
(45) Date of Patent: Mar. 6, 2001

(54) SOLAR COLLECTOR AND METHOD FOR MANUFACTURE THEREOF

(76) Inventor: Albertus Kooij, Lorentzlaan 14, NL-7535 CK Eschende (NL)

(*) Notice: Subject to any disclaimer, the term of this patent is extended or adjusted under 35 U.S.C. 154(b) by 0 days.

(21) Appl. No.: 09/372,184

(22) Filed: Aug. 11, 1999

(51) Int. Cl.⁷ .................................................. F24J 2/24
(52) U.S. Cl. .................. 126/651; 126/621; 126/711; 126/714; 126/709
(58) Field of Search ................... 126/651, 621, 126/711, 661, 709, 714, 669, 713, 666, 706; 165/168; 428/163, 188

(56) References Cited

U.S. PATENT DOCUMENTS

| | | | |
|---|---|---|---|
| 3,039,453 | * 6/1962 | Andrassy | 126/621 |
| 3,129,703 | * 4/1964 | Tabor | 126/661 |
| 4,038,967 | * 8/1977 | Stout et al. | 126/711 |
| 4,085,734 | * 4/1978 | Gibbs | 126/709 |
| 4,089,324 | * 5/1978 | Tjaden | 126/710 |
| 4,134,389 | * 1/1979 | Mcclintock | 126/668 |
| 4,146,014 | * 3/1979 | Allegro | 126/621 |
| 4,194,491 | * 3/1980 | Randall | 126/711 |
| 4,201,193 | * 5/1980 | Ronc | 126/661 |
| 4,237,861 | * 12/1980 | Fayard et al. | 126/709 |
| 4,271,818 | * 6/1981 | Hastwell | 126/713 |
| 4,291,683 | * 9/1981 | Bayles | 126/623 |
| 4,296,736 | * 10/1981 | Soot | 126/621 |
| 4,301,786 | * 11/1981 | Kirchmayer | 126/661 |
| 4,509,502 | * 4/1985 | Youcha | 126/699 |
| 4,608,960 | * 9/1986 | Hering | 126/709 |
| 4,750,473 | * 6/1988 | Dunn | 126/621 |
| 4,953,537 | * 9/1990 | Allegro | 126/709 |
| 5,022,381 | * 6/1991 | Allegro | 126/622 |
| 5,167,218 | * 12/1992 | Deakin | 126/661 |
| 5,460,164 | * 10/1995 | Rekstad et al. | 126/714 |
| 6,036,323 | * 3/2000 | Meijer | 126/696 |

FOREIGN PATENT DOCUMENTS

| | | |
|---|---|---|
| 1266514 | 5/1960 | (FR) . |
| 2507645 | 6/1981 | (FR) . |
| 7905950 | 2/1980 | (NL) . |
| 8100527 | 9/1982 | (NL) . |

* cited by examiner

Primary Examiner—Ira S. Lazarus
Assistant Examiner—David Lee
(74) Attorney, Agent, or Firm—Webb, Ziesenheim Logsdon Orkin & Hanson, P.C.

(57) ABSTRACT

The invention relates to a solar collector, comprising:
  a cover layer to be directed toward the incident solar radiation;
  a system of tubes which is thermally coupled to the cover layer and through which heat transfer medium, in particular liquid such as water, can flow between a feed connection and a discharge connection;
  a substantially form-stiff carrier layer supporting the tube system and the cover later.

The solar collector according to the invention has the special feature that:
  the cover layer consists of a weather-resistant plastic roof-covering foil;
  the tubes consist at least partially of a plastic material welded fixedly to the cover layer;
  the carrier layer is provided with recesses in which the tube system is accommodated.

9 Claims, 4 Drawing Sheets

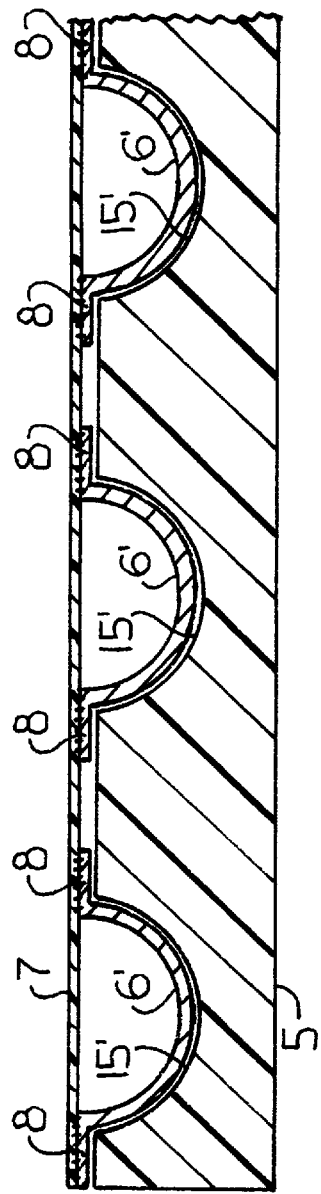
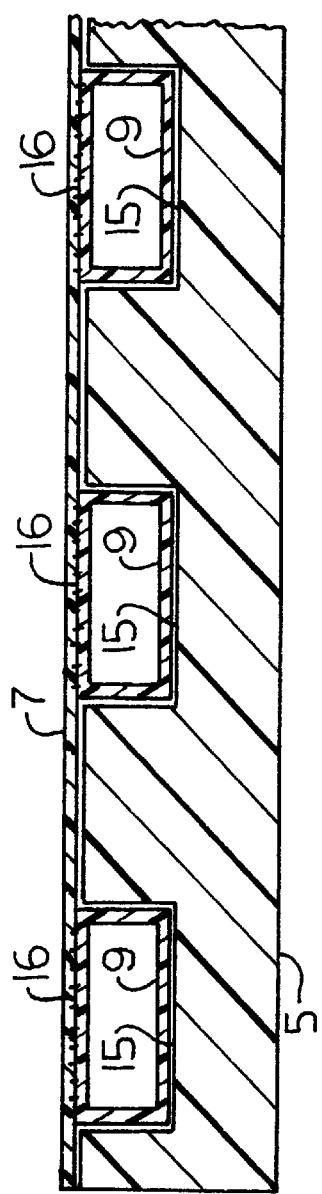
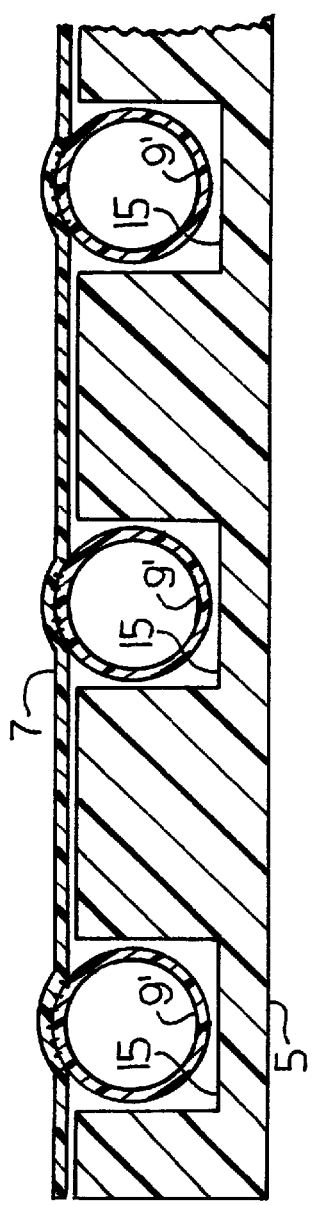
Fig. 3
Fig. 4
Fig. 5

SOLAR COLLECTOR AND METHOD FOR MANUFACTURE THEREOF

BACKGROUND OF THE INVENTION

1. Field of the Invention

The present invention relates generally to solar collectors.

2. Description of the Prior Art

Solar collectors are known in many embodiments. Known solar collectors often have a relatively high efficiency but, as a result of the design requirements, this means that, they have the drawback of high cost.

It is an object of the invention to embody a solar collector such that it can be manufactured with very simple and commercially available materials such that the manufacture can take place with per se known simple means and the solar collector can thereby be manufactured very cheaply.

It is a further object of the invention to embody a solar collector such that it is suitable for manufacture not only in a factory but, if desired, also on-site. This latter embodiment can have the advantage that the collector can be easily adapted to the conditions, whereby, in the case conditions vary slightly from working location to working location, no delay in the work need occur.

A further advantage of manufacturing a solar collector on-site in accordance with the present invention can be that transport problems relating to often vulnerable structures such as solar collectors are essentially prevented. Only optionally pre-processed raw materials have to be transported.

A further advantage of a solar collector according to the invention is that it is integrated into the roof-covering, whereby the water-sealing layer does not have to be drilled through for mounting of a solar collector, that less material is used for both roof-covering and solar collector whereby there is less impact on the environment, and that in the case no heat is absorbed from for instance solar radiation, heat from the building on which the roof-covering lies can be collected before it reaches the outside air.

SUMMARY OF THE INVENTION

In respect of the above stated objectives and advantages the invention generally provides a solar collector which has the special feature that:

the cover layer consists of a weather-resistant plastic roof-covering foil;

the tubes consist at least partially of a plastic material welded fixedly to the cover layer;

the carrier layer is provided with recesses in which the tube system is accommodated.

The tubes of the tube system can be embodied as known commercially obtainable tubes. An advantage of this structure is that such tubes possess an excellent technical medium-tightness and are relatively inexpensive. The drawback of such a structure can be that both the cover layer and the tube wall give rise to a certain heat resistance, whereby in combination the heat transfer from the outer surface of the cover layer heated by the sun to the heat transfer medium may leave something to be desired in some conditions.

In respect of the above, the solar collector in this specific embodiment can have the special feature that the tubes are embodied as gutters, the free end zones of which are welded to the cover layer. In this embodiment the stated heat resistance consists solely of the heat resistance formed by the cover layer, whereby an increased efficiency is obtained.

A specific embodiment has the feature that the cover layer consists of polyvinyl chloride (PVC) or a foil of thermoplastic olefin (TPO) such as polyethylene (PE), an ethane-propene copolymer (EP) or other weldable materials. It is noted that this material is highly suitable since it has very little tendency to static charting and thus attraction of dirt.

According to a specific aspect the solar collector according to the invention can have the special feature that the cover layer consists of EPROTOP®, Gebr. Kooij, Enschede, the Netherlands.

Alternatively, the cover layer can consist of MECHAFOL®, Gebr. Kooij, Enschede, the Netherlands.

Depending on the nature of the material of the carrier layer, an appropriate technique can be chosen for arranging the recesses. Generally deemed very practical is an embodiment in which the recesses are formed in the carrier layer by milling.

An alternative embodiment has the special feature that the carrier layer with the recesses is formed by means of a correspondingly modelled mould, for instance by moulding, injection moulding or the like.

Different materials can be considered suitable for manufacture of the carrier layer. A very suitable embodiment has the feature that the carrier layer consists at least partially of mineral wool, polyurethane (PU), polystyrene (PS) or the like, optionally with a cover layer consisting of a web of fibre material, for instance glass fibres.

In order to optimize heat transfer a preferred embodiment can have the special feature that the outer surface of the cover layer possesses spectrum-selective properties, is for instance matt black.

For a very good dimensional stability the solar collector can have the special feature that the cover layer comprises a reinforcement.

The tubes can consist off any suitable material. Suitable choices include materials corresponding with the roof-covering.

The invention further provides a method of manufacturing a solar collector of the above specified type. According to the invention this method comprises the following steps, to be performed in suitable sequence, of:

(a) providing a cover layer consisting of a weather-resistant plastic roof-covering foil;

(b) providing elongate structures for forming a tube system;

(c) providing a carrier layer;

(d) welding the elongate structures fixedly to the cover layer to form a tube system coupled inseparably to this cover layer;

(e) modelling or treating the carrier layer such that it acquires recesses into which the tube system fits;

(f) placing the cover layer with the tube system on the carrier layer in register with the recesses.

A specific embodiment comprises the step of (g) performing step (d) by welding the elongate structures and the cover layer to each other over the nominal elongate contact surfaces by means of a welding head, for instance a hot air blowing device, moved at a chosen speed along said contact surfaces by for instance causing the welding head, in the case of said blowing device, to blow hot air continuously into the pinch between these contact surfaces or by heating these contact surfaces in other manner, followed by pressing thereof such that first melting, followed by pressing, fusing and cooling occur.

Finally, the invention provides a method of the type stated in the foregoing paragraph, comprising the following steps, to be performed in suitable sequence, of:

(h) providing a tray serving as mould;
(i) placing the cover layer with tube system obtained in step (g) into the tray such that the cover layer lies on the bottom of the tray;
(j) filling the tray with curable, optionally foaming plastic, for instance polyurethane (PU);
(k) closing the tray with a cover, at least when foaming plastic is used;
(l) causing the plastic to cure;
(m) removing the finished solar collector.

The invention will now be elucidated with reference to the annexed drawings.

BRIEF DESCRIPTION OF THE DRAWINGS

FIG. 3 is a schematic cross-section through a second embodiment;

FIG. 4 is a cross-section corresponding with FIG. 3 through a third embodiment;

FIG. 5 is a cross-section corresponding with FIG. 3 through a fourth embodiment.

Functionally corresponding elements are designated where possible and appropriate in the figures with the same reference numerals.

DETAILED DESCRIPTION OF THE PREFERRED EMBODIMENTS

Figure 1:
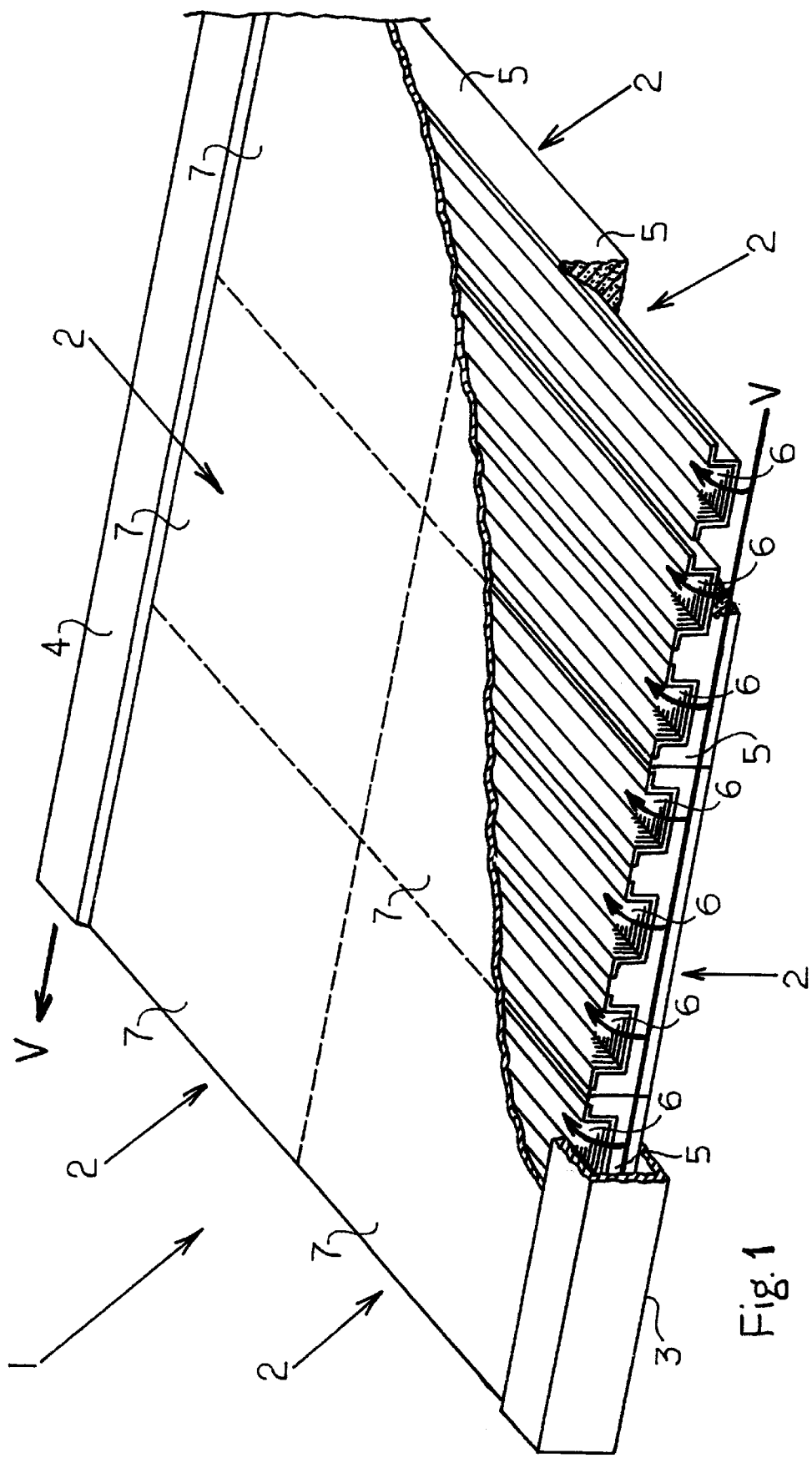
FIG. 1 shows a perspective view with partly cut-away parts of a solar collector according to the invention.

FIG. 1 shows a solar collector 1 according to the invention. This solar collector 1 comprises a number of panels 2, an inlet channel 3 and an outlet channel 4. Each panel 2 comprises a carrier layer 5 with grooves 15 formed therein in which a gutter 6 is accommodated, and a cover layer 7 arranged over these gutters. Gutters 6 are connected in liquid-tight manner to cover layer 7 along edges 8 such that channels are formed through which heat transfer medium can flow. Each panel 2 is connected in lengthwise direction of gutters 6 to the adjacent panels such tat the gutters of both panels lie mutually in line and connect mutually in liquid-tight manner. Cover layers 7 of adjacent panels 2 are herein welded to each other.

On the edges of such an assembled roof-covering an inlet channel 3 and outlet channel 4 are connected liquid-tightly to gutters 6. It hereby becomes possible to allow a liquid through gutters 6, whereby the flowing liquid can absorb and carry along heat. During periods when the sun shines this heat comes from solar radiation which is converted by cover layer 7, which preferably has a matt black form, into heat which is subsequently absorbed by the liquid flow. In the case of periods without solar radiation, for instance at night or when a layer of snow covers the roof, the liquid is heated by heat coming from the building.

Instead of using inlet channels 3 and outlet channels 4 it is also possible to mutually connect gutters 6 such that one long meandering gutter is effectively formed.

Figure 2:
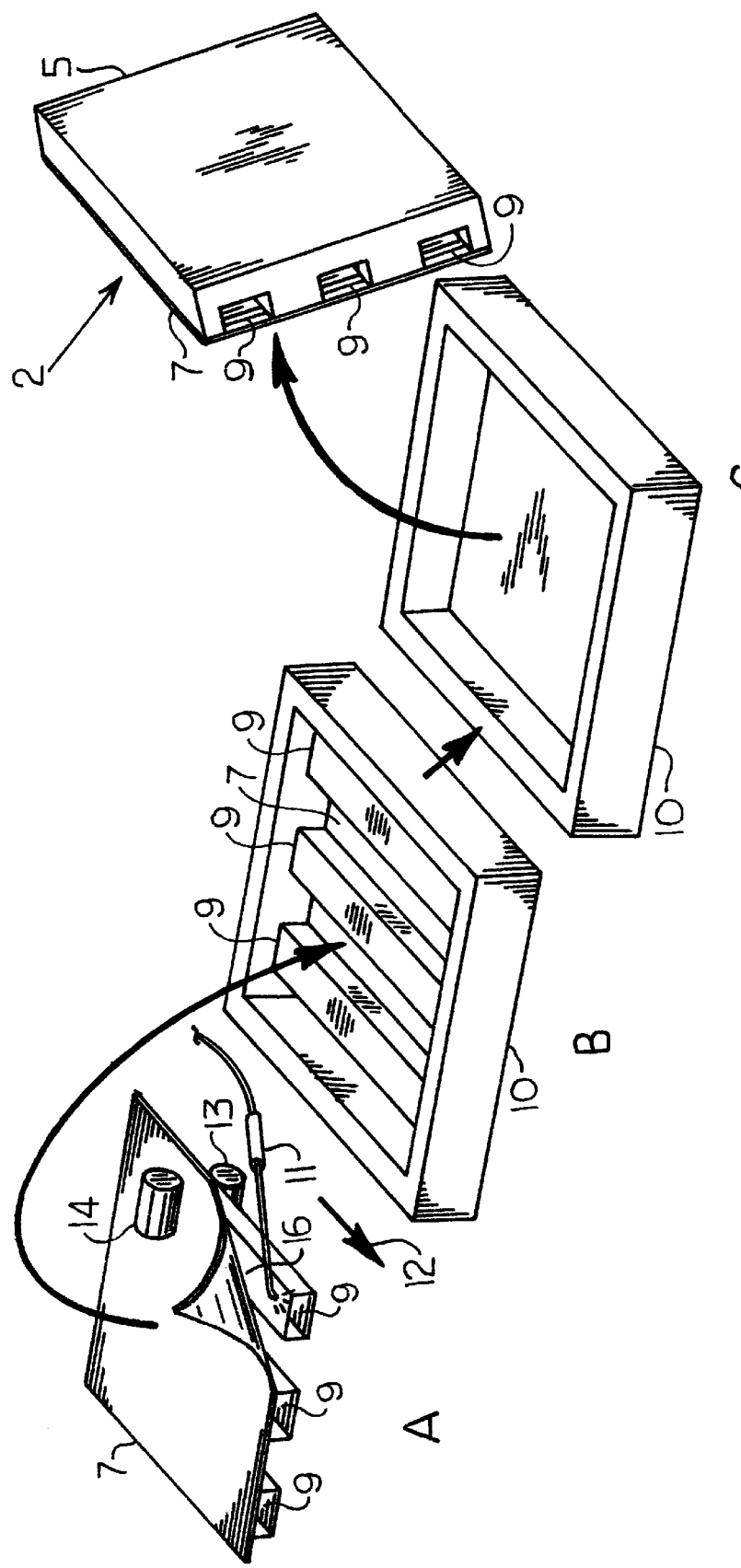
FIG. 2 is a schematic view of the method according to the invention.

FIG. 2 shows schematically a method of manufacturing a solar collector according to the invention. In accordance with this method there results a panel 2 as is applied in the roof-covering of FIG. 1.

According to the method a number of tubes 9 are preferably placed parallel and adjacent to each other in step A. A cover layer 7 is then connected to tubes 9 by means of for instance hot air. The heated and thus softened contact surfaces are pressed against each other by making use of one or two pressure rollers connected to heating nozzle 11. This latter, which is transported either manually or automatically as according to arrow 12, provides suitable heating, while pressure rollers 13, 14 pressed towards each other by spring means (not shown) ensure that the still warm and thus softened contact surfaces are pressed intimately against each other. A complete fusion subsequently takes place through cooling.

It is noted that heating nozzle 11 and rollers 13, 14 are shown very schematically. They can preferably be embodied as one integral unit.

In step B this unit of tubes 9 and cover layer 7 is then placed in a tray 10 such that the cover layer lies on the bottom of the tray. The tray is then filled with curable, optionally foaming plastic. This plastic can be for instance polyurethane or polystyrene. After curing of plastic 5 the panel 2 can be removed from tray 10 in step C and employed for a solar collector as in FIG. 1. In the case of foaming plastic the mould is closed by a cover after the plastic has been introduced. With an overmeasure of plastic an integral foam structure is obtained with closed skin.

Alternatively, a sheet of for instance polystyrene or polyurethane can be provided by means of milling with gutters in which an assembly as formed in step A can be placed.

FIG. 3 shows an alternative structure which in principle corresponds with the structure according to FIG. 1. Gutters 6' have a general omega shape, wherein the edges or flanges 8 are welded to cover layer 7. In this embodiment the recesses 15' are curved and formed more or less semi-cylindrically in accordance with the relevant shape of gutters 6'.

Attention is drawn to the fact that for the sake of clarity in this FIG. 3, and also in FIGS. 4 and 5, the gutters and tubes are drawn at some distance from carrier layer 5. In practical conditions they will be in contact therewith.

FIG. 4 shows a third embodiment corresponding with FIG. 2. Tubes 9 are welded with their upper surfaces 16 to cover layer 7.

FIG. 5 shows an embodiment wherein tubes 9' have a cross-section which is not rectangular as in FIGS. 2 and 4, but round. In this embodiment the cover layer 7' is also welded to the upper surface of tubes 9' as in the embodiment according to FIG. 4.

The embodiments of FIGS. 4 and 5 make use of prefabricated tubes, while the embodiments of FIGS. 1 and 3 make use of gutters which, together with cover layer 7, bound channels.

Appropriate choices for cover layer 7 consist inter alia of roof-covering materials supplied by Gebr. Kooij, Enschede, the Netherlands under the trade names EPROTOP® and MECHAFOL®.

Figure 6:
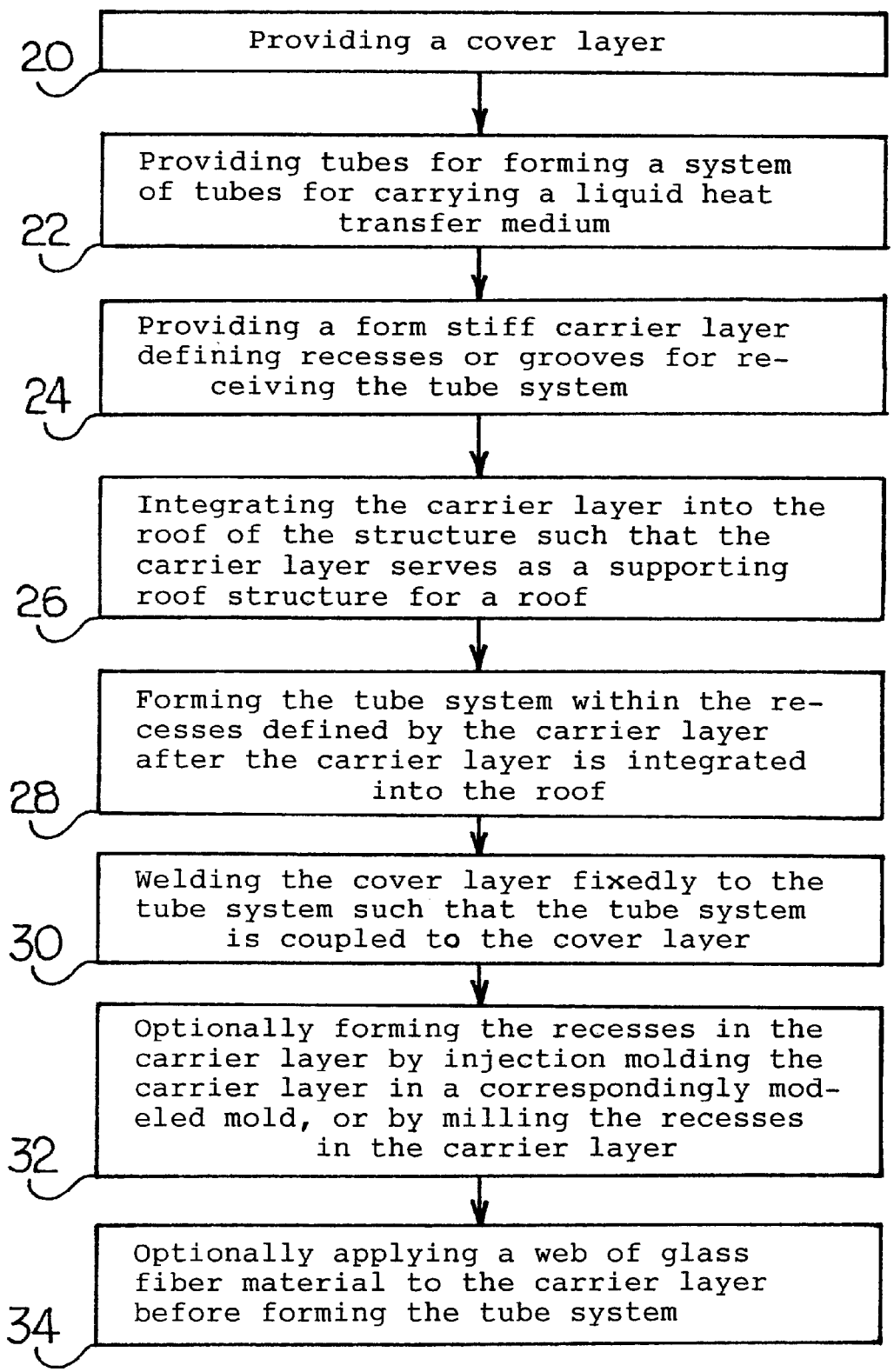
FIG. 6 schematically illustrates a method of assembling a solar collector integrated into a roof of a structure in accordance with the present invention.

Attention is drawn to the fact that carrier layer 5 can also consist of a supporting roof structure, for instance a roof boarding. The advantage of using thermally insulating materials lies however in the fact that they generally lend themselves more readily to modelling or processing such that the recesses required for the tube system are formed therein and that in respect of solar collectors they further possess generally favourable thermally insulating properties. Accordingly, the present invention is also a method of assembling a solar collector 1 that is integrated into a roof of a structure. FIG. 6 schematically illustrates the method according to the present invention. The carrier layer 5 in the method according to FIG. 6 serves as the supporting roof structure for the roof of the structure. The method includes the steps of: in step 20 providing a cover layer 7 made of a weather-resistant plastic roof covering foil; providing tubes 9 for forming a tube structure for carrying a liquid heat transfer medium at step 22; proving a form stiff carrier layer 5 defining recesses or grooves 15 for receiving the tube system at step 24; integrating the carrier layer 5 at step 26 into the roof of the structure such that the carrier layer 5 serves as a supporting roof structure for the roof of the structure; forming the tube system at step 28 within the recesses 15 defined by the carrier layer 5 after the carrier layer 5 is integrated into the roof of the structure; and welding the cover layer 7 fixedly to the tubes 9 of the tube system such that the tube system is coupled to the cover layer 5 at step 30. The tubes 9 at step 22 may be provided in the form of gutters 6, as discussed previously. The method may further include the step of forming the recesses 15 in the carrier layer 5 by injection molding the carrier layer 5 in a correspondingly modeled mold at step 32. The recesses 15 may also be formed by a milling operation prior to providing the carrier layer at step 32. The method may also include the step of applying a web of glass fiber material to the carrier layer 5 as illustrated at step 34.

What is claimed is:

1. A method of assembling a solar collector integrated into a roof of a structure, comprising the steps of:

providing a cover layer made of a weather-resistant plastic roof covering foil;

providing tubes for forming a tube system for carrying a liquid heat transfer medium;

providing a form-stiff carrier layer defining recesses for receiving the tube system;

integrating the carrier layer into the roof of the structure such that the carrier layer serves as a supporting roof structure for the roof of the structure;

forming the tube system within the recesses defined by the carrier layer after the carrier layer is integrated into the roof of the structure;

welding the cover layer fixedly to the tube system with a welding head moved at a chosen speed along contact surfaces between the cover layer and the tube system, such that the tube system is coupled to the cover layer; and pressing the contact surfaces together such that melting, pressing, fusing and cooling occur in succession and the cover layer is bonded to the tube system.

2. The method as claimed in claim 1, further including the step of milling the recesses in the carrier layer.

3. The method as claimed in claim 1, further including the step of providing the tubes as gutters for forming the tube system.

4. The method as claimed in claim 3, further including the step of welding the cover layer to free end zones of the gutters comprising the tube system.

5. The method as claimed in claim 1, wherein the cover layer is made of a material selected from the group consisting of polyvinyl chloride, polyethylene and an ethene-propene copolymer.

6. The method as claimed in claim 1, further including the step of forming the recesses in the carrier layer by injection molding the carrier layer in a correspondingly modeled mold.

7. The method as claimed in claim 1, wherein the carrier layer consists at least partially of a material selected from the group consisting of mineral wool, polyurethane and polystyrene.

8. The method as claimed in claim 1, wherein an outer surface of the cover layer possesses spectrum selective properties.

9. The method as claimed in claim 1, further including the step of applying a web of glass fiber material to the carrier layer.

* * * * *

UNITED STATES PATENT AND TRADEMARK OFFICE
CERTIFICATE OF CORRECTION

PATENT NO.   : 6,196,216 B1
DATED        : March 6, 2001
INVENTOR(S)  : Albertus Kooij Page 1 of 1

It is certified that error appears in the above-identified patent and that said Letters Patent is hereby corrected as shown below:

Title page,
Insert -- [30] Foreign Application Priority Data
Aug. 11, 1998   (NL) .................... 1009837 --.

Refer to [57] ABSTRACT, replace Abstract with the following Abstract:

-- A solar collector generally includes a cover layer directable toward incident solar radiation; a system of tubes thermally coupled to the cover layer and containing heat transfer medium, such as water, with the heat transfer medium flowing between a feed connection and a discharge connection; and a substantially form-stiff carrier layer supporting the tube system and the cover layer. The cover layer may be a water-resistant plastic roof-covering foil. The tubes of the tube system may each consist at least partially of a plastic material welded fixedly to the cover layer. The carrier layer may be provided with recesses in which the tube system is positioned. --

Column 1,
Line 11, after "they" insert -- also --.

Column 3,
Line 45, "such tat" should read -- such that --.

Signed and Sealed this

Eleventh Day of September, 2001

Attest:

NICHOLAS P. GODICI
*Acting Director of the United States Patent and Trademark Office*

*Attesting Officer*